(12) United States Patent
Koga

(10) Patent No.: US 8,106,912 B2
(45) Date of Patent: Jan. 31, 2012

(54) PARALLEL IMAGE PROCESSING SYSTEM CONTROL METHOD AND APPARATUS

(75) Inventor: Takuya Koga, Tokyo (JP)

(73) Assignee: NEC Corporation, Tokyo (JP)

( * ) Notice: Subject to any disclaimer, the term of this patent is extended or adjusted under 35 U.S.C. 154(b) by 678 days.

(21) Appl. No.: 12/224,988

(22) PCT Filed: Dec. 5, 2006

(86) PCT No.: PCT/JP2006/324213
§ 371 (c)(1),
(2), (4) Date: Sep. 11, 2008

(87) PCT Pub. No.: WO2007/116560
PCT Pub. Date: Oct. 18, 2007

(65) Prior Publication Data
US 2009/0106528 A1    Apr. 23, 2009

(30) Foreign Application Priority Data
Mar. 30, 2006  (JP) .................. 2006-092831

(51) Int. Cl.
*G06F 15/80* (2006.01)
(52) U.S. Cl. ........................ 345/505; 345/502
(58) Field of Classification Search .......... 345/505, 345/519, 502; 712/22; 348/561; 711/22; 709/226
See application file for complete search history.

(56) References Cited

U.S. PATENT DOCUMENTS

| | | | | |
|---|---|---|---|---|
| 6,741,294 | B2 * | 5/2004 | Izawa ........................ | 348/581 |
| 2003/0132940 | A1 | 7/2003 | Yamagata et al. | |
| 2004/0250048 | A1 | 12/2004 | Nakajima | |
| 2005/0188087 | A1 * | 8/2005 | Iyoda .......................... | 709/226 |
| 2005/0257026 | A1 * | 11/2005 | Meeker ....................... | 712/22 |
| 2006/0236075 | A1 | 10/2006 | Hara | |
| 2009/0198898 | A1 * | 8/2009 | Stuttard et al. ............. | 711/125 |
| 2011/0083000 | A1 * | 4/2011 | Rhoades et al. ............ | 712/22 |

FOREIGN PATENT DOCUMENTS

| | | |
|---|---|---|
| JP | 04-291659 | 10/1992 |
| JP | 05-174166 | 7/1993 |
| JP | 2839026 | 10/1998 |
| JP | 2002-007359 A | 1/2002 |
| JP | 2004-362086 A | 12/2004 |
| WO | WO 2005/069215 A1 | 7/2005 |

* cited by examiner

*Primary Examiner* — Kee M Tung
*Assistant Examiner* — Leon T Cain, II
(74) *Attorney, Agent, or Firm* — Foley & Lardner LLP

(57) ABSTRACT

To reduce the required amount of program codes when processing the whole image in a one-dimensional SIMD parallel image processing system having a smaller number of PEs than the number of pixels in the width direction of the image to be processed. A controller for controlling a PE array includes a command repetitive-execution part, which includes an operand converting part, a memory address converting part, and an operation code converting part. When a command fetching/decoding part reads and executes program codes stored in a program memory, the repetitive-execution part determines the program codes to cause the operand converting part, memory address converting part and operation code converting part to perform conversions in accordance with the command, thereby performing a repetitive execution of the one-command program description adaptive to a plurality of related pixels assigned to the PEs, whereby the program code amount can be reduced.

7 Claims, 7 Drawing Sheets

FIG. 7

| | |
|---|---|
| 1: LD MEM1,R(0) | READ CONTENT OF ADDRESS MEM1 OF LOCAL MEMORY TO REGISTER R(0) |
| 2: MVL R(0),R(1) | READ VALUE OF REGISTER R(0) CORRESPONDING TO RIGHT PIXEL TO REGISTER R(1) |
| 3: ABS R(0),R(1),R(2) | CALCULATE ABSOLUTE VALUE OF DIFFERENCE OF REGISTERS R(0), R(1), AND STORE RESULT IN REGISTER R(2) |
| 4: ST MEM2,R(2) | WRITE CONTENT OF REGISTER R(2) IN ADDRESS MEM2 OF LOCAL MEMORY |

PARALLEL IMAGE PROCESSING SYSTEM CONTROL METHOD AND APPARATUS

CROSS-REFERENCE TO RELATED APPLICATIONS

This application is based upon and claims the benefit of priority from Japanese patent application No. 2006-092831, filed on Mar. 30, 2006, the disclosure of which is incorporated herein in its entirety by reference.

TECHNICAL FIELD

The present invention relates to parallel image processing systems, in particular, to control method and apparatus of a parallel image processing system including a one-dimensional SIMD (Single Instruction Multiple Data) processor array structure.

BACKGROUND ART

One example of a conventional parallel image processing system is disclosed in Japanese Patent Publication No. 2839026 (patent document 1) and Japanese Laid-Open Patent Publication No. 2002-7359 (patent document 2). The conventional parallel image processing system is configured by a PE array in which great number of calculation element processors (Processor Element, hereinafter referred to as "PE") are parallel connected one-dimensionally, and a controller for controlling the same. Each PE is configured by a calculating part (ALU) for performing the calculation process, a local memory for storing local pixel values of the image to be processed, and a register for holding a temporary calculation result.

When performing some kind of calculation on a specific row of the image to be processed stored in the local memory, the conventional parallel image processing system having such configuration reads the pixel value from the address corresponding to the specific row of the local memory, and stores the same in the register. Then, the pixel value stored in the register is read out, the calculation is performed in the ALU, and the calculation result is stored in the register. The calculation result stored in the register is stored in the specific row of the local memory. When the pixel value positioned at the periphery of the pixel to be processed is required in the calculation, the necessary pixel value is collected using a data transfer unit between the PEs, and the calculation is performed.

Japanese Laid-Open Patent Publication No. 2004-362086 (patent document 3) discloses an SIMD parallel processing system having a function of automatically performing repetitive execution of a PE command according to the parallelism of the PE to enhance the program efficiency in a case where the system does not have an optimum number of PEs in the image to be processed. In the parallel processing system, the number of repetitive executions is calculated from the parallelism information instructed by the program and the parallelism information of the SIMD calculator, and the automatic repetitive execution of the PE command is realized necessary number of times according to the number of PEs of the system.

Patent document 1: Japanese Patent Publication No. 2839026 (e.g., FIG. 1, paragraph 0008)
Patent document 2: Japanese Laid-Open Patent Publication No. 2002-7359 (e.g., FIG. 1, paragraphs 0014 to 0016)
Patent document 3: Japanese Laid-Open Patent Publication No. 2004-362086 (e.g., paragraphs 0011 to 0021, FIG. 1)

DISCLOSURE OF INVENTION

Problems to be Solved by the Invention

However, in the conventional parallel image processing system, the arrangement of the pixels on the memory and the automatization of data acquisition over the PEs in a case where the number of PEs is smaller than the number of pixels in the width direction of the image to be processed and a plurality of pixels is assigned to each PE to perform the process is not taken into consideration.

In the system described in patent document 3, the same command or the same sub-routine are repetitively executed, but a process including communication with an adjacent PE cannot be automated in such a simple repetitive execution. In order to realize the process requiring the neighboring pixel value, an addition of a special process corresponding to whether the necessary neighboring pixel value is assigned in the same PE or the adjacent PE becomes necessary, and the amount of program code increases.

It is an object of the present invention to provide a novel parallel image processing system and control method thereof enabling automatization of the process requiring the neighboring pixel value.

Another object of the present invention is to provide a control method and an apparatus of an image processing system capable of executing image processing on the entire image with the program code amount of the same extent as the one-dimensional SIMD parallel image processing system having the same number of PEs as the number of pixels in the width direction of the image to be processed even in the process requiring the neighboring pixel value.

Means for Solving the Problem

The present invention relates to a control method of a parallel image processing system having a smaller number of element processors than number of pieces of data to be processed, each element processor processing plural pieces of data to be processed; the method includes automatically performing repetitive execution of a command according to the number of pieces of data to be processed assigned to the element processor; replacing an operation code according to the data to be processed during respective executions in repetition when repetitively executing a predetermined command; and controlling the element processor by the replaced operation code.

According to one exemplary embodiment of the invention, the present invention relates to a control method of a parallel image processing system including a one-dimensional processor array structure having smaller number of element processors than number of pixels in a width direction of an image to be processed, each element processor processing plural pixels; the method includes automatically performing repetitive execution of a command according to the number of pixels assigned to the element processor; wherein when repetitively executing an adjacent pixel value acquisition command, an operation code is replaced with a combination of a command for transferring a pixel value from an adjacent element processor and a command for acquiring a pixel value on an own element processor according to a position of the pixel to be processed; and the element processor is controlled by the replaced operation code.

Further, a register group is divided in accordance with the number of pixels assigned to each element processor for use, and the operand is rewritten to switch the register group to be used in the repetitive execution; and an offset value corresponding to the number of pixels assigned to the element processor is added to an address in repetitive execution of a memory access command.

A parallel image processing system according to one example of the present invention includes: in a controller for controlling the PE array according to the program, a device for automatically performing repetitive execution of a command of each address in a program according to the number of pixels assigned to each PE; and further includes a device for converting an operand in the command to be repetitively executed; a device for converting an address in memory access in the command to be repetitively executed; and a device for converting an operation code according to the pixel position in the plurality of pixels assigned to each PE in repetitive execution.

With such configuration, the automatization of a process requiring neighboring pixel values can be realized by automatically performing repetitive execution of one command described in the program on the plurality of pixels to be processed assigned to each PE, and performing operation code conversion, whereby the image processing on the entire image can be executed with the program code amount of the same extent as the one-dimensional SIMD parallel image processing system having the same number of PEs as the number of pixels in the width direction of the image to be processed.

Advantageous Effect of the Invention

As described above, according to the present invention, the repetitive execution of the command is automatically performed according to a number of pieces of data to be processed assigned to the element processor, the operation code is replaced according to the data to be processed in the respective executions during repetition when repetitively executing a predetermined command, and the element processor is controlled by the replaced operation code. Thus, the command conversion taking into consideration the pixel position can be performed in the surrounding pixel values acquisition command etc. of that need to be performed with different operations depending on the pixel position to be executed, and automatization of the process requiring the neighboring pixel values can be realized with small amount of program code.

In the one-dimensional SIMD image processing system having smaller number of PEs than the number of pixels in the width direction of the image to be processed, repetitive execution can be automatically performed with only the program description of the command on one pixel according to the repetitive-execution device, the device for converting the operand, and the device for converting the memory address, which are arranged in the controller, and furthermore, automatization of the process requiring neighboring pixel values can be realized and image processing on the entire image can be executed without increasing the amount of program code by converting the operation code.

BRIEF DESCRIPTION OF THE DRAWINGS

FIG. 7 is a view showing one example of a program for operating the parallel image processing system according to one example of the present invention.

DESCRIPTION OF THE SYMBOLS

Figure 1:
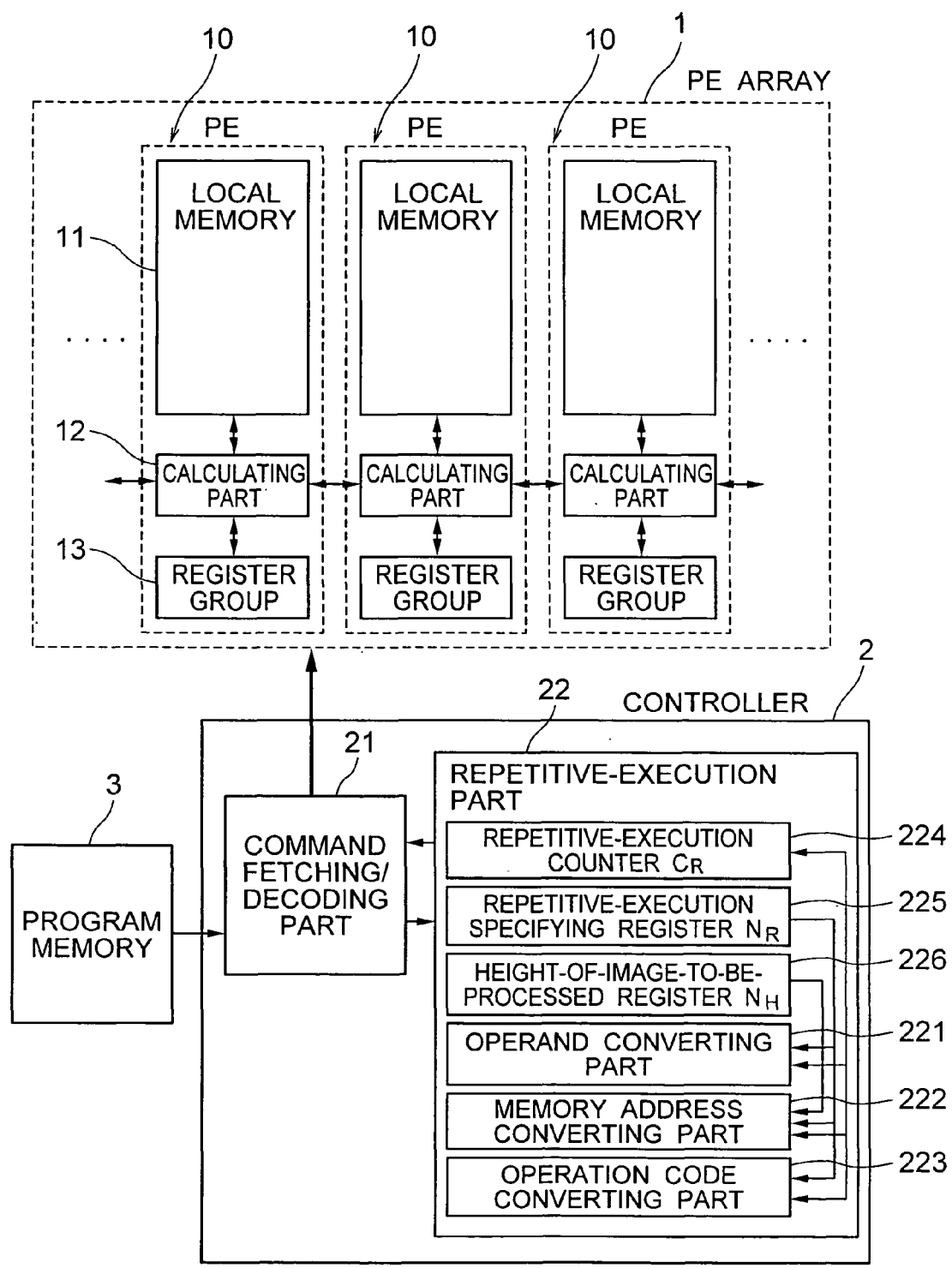
FIG. 1 is a block diagram showing a functional configuration of a parallel image processing system according to one exemplary embodiment of the invention.

1 PE array
2 controller
3 program memory
10 PE
11 local memory
12 calculating part
13 register
21 command fetching/decoding part
22 repetitive-execution part
221 operand converting part
222 memory address converting part
223 operation code converting part
224 repetitive-execution counter
225 repetitive-execution specifying register
226 height-of-image-to-be-processed register [0017]

BEST MODE FOR CARRYING OUT THE INVENTION

The exemplary embodiments of the invention will be described in detail below based on the drawings.

1. System Configuration

FIG. 1 is a block diagram showing a functional configuration of a parallel image processing system according to one exemplary embodiment of the invention. The parallel image processing system according to the exemplary embodiment includes a PE array 1 for performing a command operation in each image processing, a controller 2 for controlling the operation of the PE array 1 according to a program, and a program memory 3 for storing the program describing image processing to be executed.

The PE array 1 has a configuration in which a plurality of PEs 10 is arrayed and connected one-dimensionally, and each PE is configured as a SIMD type executing the same program. Note that only three adjacent PEs are shown in FIG. 1 to avoid complication.

Each PE 10 includes a local memory 11, a calculating part 12, and a register group 13. The number of PE 10 contained in the PE array 1 is desirably an integral submultiple of the number of pixels in the width direction of the image to be processed. This is so that the same number of pixels can be assigned to each PE 10. The present invention, however, is applicable even if the condition of an integral submultiple is not satisfied, and similar effects can be obtained.

The controller 2 is a unit for controlling the operation sequence of the PE array 1, and includes a command fetching/ decoding part 21 and a repetitive-execution part 22. The repetitive-execution part 22 is a unit for performing repetitive execution according to the number of pixels to be processed assigned to each PE with respect to the command executed by the controller 2, and includes an operand converting part 221, a memory address converting part 222, an operation code converting part 223, a repetitive-execution counter 224, a repetitive-execution specifying register 225, and a height-of-image-to-be-processed register 226.

The repetitive-execution counter 224 is a counter CR used when the command is repetitively executed by the number of times specified with the value of the repetitive-execution specifying register 225 in the repetitive-execution part 22. The repetitive-execution specifying register 225 is a register for specifying and holding the number of repetitions NR when performing the repetitive execution of the command, and specifies the necessary number of repetitions, that is, the number of pixels to be processed assigned to each PE, according to the ratio of the number of PEs and the number of pixels in the width direction of the image to be processed. The height-of-image-to-be-processed register 226 is a register for storing and holding the number of pixels NH in the height direction of the image to be processed, where such value is used to calculate an offset value of the address storing the image to be processed in the repetitive execution of the memory access command.

1.1) PE Array

The PE array 1 assigns the pixel of the image to be processed to each PE 10 and performs the image processing operation by operating the same command in parallel in each PE. The PE 10 is an element processor for storing and calculating the assigned pixel value in the image to be processed, and has a command execution function of the normal processor and performs the command operation in response to a control signal from the controller 2. Each PE 10 is connected to the adjacent PE 10 to exchange data.

The local memory 11 is a memory individually arranged in each PE 10 and closely connected to the calculating part 12, and stores the pixel value assigned to each PE in the image to be processed and also stores the calculation result and the like in the middle of processing. The respective pixel value assigned to each PE of the image to be processed is respectively stored in the address having an offset of the number of pixels in the height direction of the image to be processed. The address offset value in this case, that is, the number of pixels in the height direction of the image to be processed is assumed as Om. For instance, if the pixel value at the left end is stored in the address A, the pixel values assigned to the PE are respectively stored in the addresses of A, A+Om, A+2×Om, and A+3×Om.

The calculating part 12 is a unit for executing read/write command of the register group 13, and read/write command, arithmetic calculation command, logical calculation command and the like on the local memory 11, and performs calculation and the like on the assigned pixel value in image processing.

The register group 13 is a calculation register individually arranged in the calculating part 12 of each PE 10, and stores the value that becomes an input in the calculating operation and the calculation result to be output. Each register is given a register number from R(0) to R(number of registers—1). In order to automatically process the plurality of pixels assigned to each PE 10, the contained number of registers is divided by the assigned number of pixels for use. For instance, if two pixels are assigned to each PE 10, the number of registers of the register group 13 is divided by two, that is, the first half and the second half for use, whereas if four pixels are assigned to each PE 10, the number of registers of the register group 13 is divided by four for use.

1.2) Controller

The controller 2 sequentially reads the program stored in the program memory 3 by the command fetching/decoding part 21, interprets the same and controls the PE array 1 to proceed the image processing.

The command fetching/decoding part 21 is a unit constituting the core part of the controller 2 that reads the program from the program memory 3, interprets the operation code and the operand, and performs the control of the PE array 1. The operation code and the operand read from the program memory 3 are provided to the repetitive-execution part 22 to perform determination of repetitive execution. If the repetitive-execution part 22 determines to perform repetitive execution, the reading of the subsequent program is stopped until the specified number of repetitions is completed. The PE array 1 is controlled using the operation code and the operand rewritten according to each step of the repetitive execution by the repetitive-execution part 22.

The repetitive-execution part 22 determines whether or not the operation code input by the command fetching/decoding part 21 is the command to be repetitively executed, and performs repetitive execution the number of times NR specified by the repetitive-execution specifying register 225 using the repetitive-execution counter 224 if the operation code is the target command. The command fetching/decoding part 21 is also instructed to stop the reading of subsequent commands from the program memory until the repetitive execution is terminated. When performing the repetitive execution, the conversion of the operand, the memory address, and the operation code is performed by the operand converting part 221, the memory address converting part 222, and the operation code converting part 223 according to the number of times NR specified by the repetitive-execution specifying register 225, that is, the number of pixels to be processed assigned to each PE and the pixel position in the pixel group to be processed calculated from the value CR of the repetitive-execution counter 224.

1.3) Operand Converting Part

The operand converting part 221 is a unit for converting the register number to switch the register using portion in the register group 13 according to the pixel position to be processed during repetitive execution. Whether or not the command requires operand conversion is determined by the operation code input from the command fetching/decoding part 21. If the operand conversion is necessary, the number of registers in the register group 13 of the PE array 1 is divided by the number of repetitive-executions NR stored in the repetitive-execution specifying register 225, and then multiplying each divided number of registers by a value from 0 to (NR−1) stored in the repetitive-execution counter 224, to obtain an offset value used in switching the register position.

If the number of registers, is not divisible by the number of repetitive-executions NR, the numbers after the decimal point are omitted so that an integer value is generated to be used, and the value CR of the repetitive-execution counter 224 is multiplied thereto to calculate the offset value. The calculated offset value is added to the operand (register number) input from the command fetching/decoding part 21 to perform operand conversion, and the operand as the conversion result is provided to the command fetching/decoding part.

A device for calculating the offset value may include a configuration using a divider or a multiplier, or a configuration using a table. Hereinafter, the operand converting part 221 configured to calculate the offset value using the table will be described.

Figure 2:
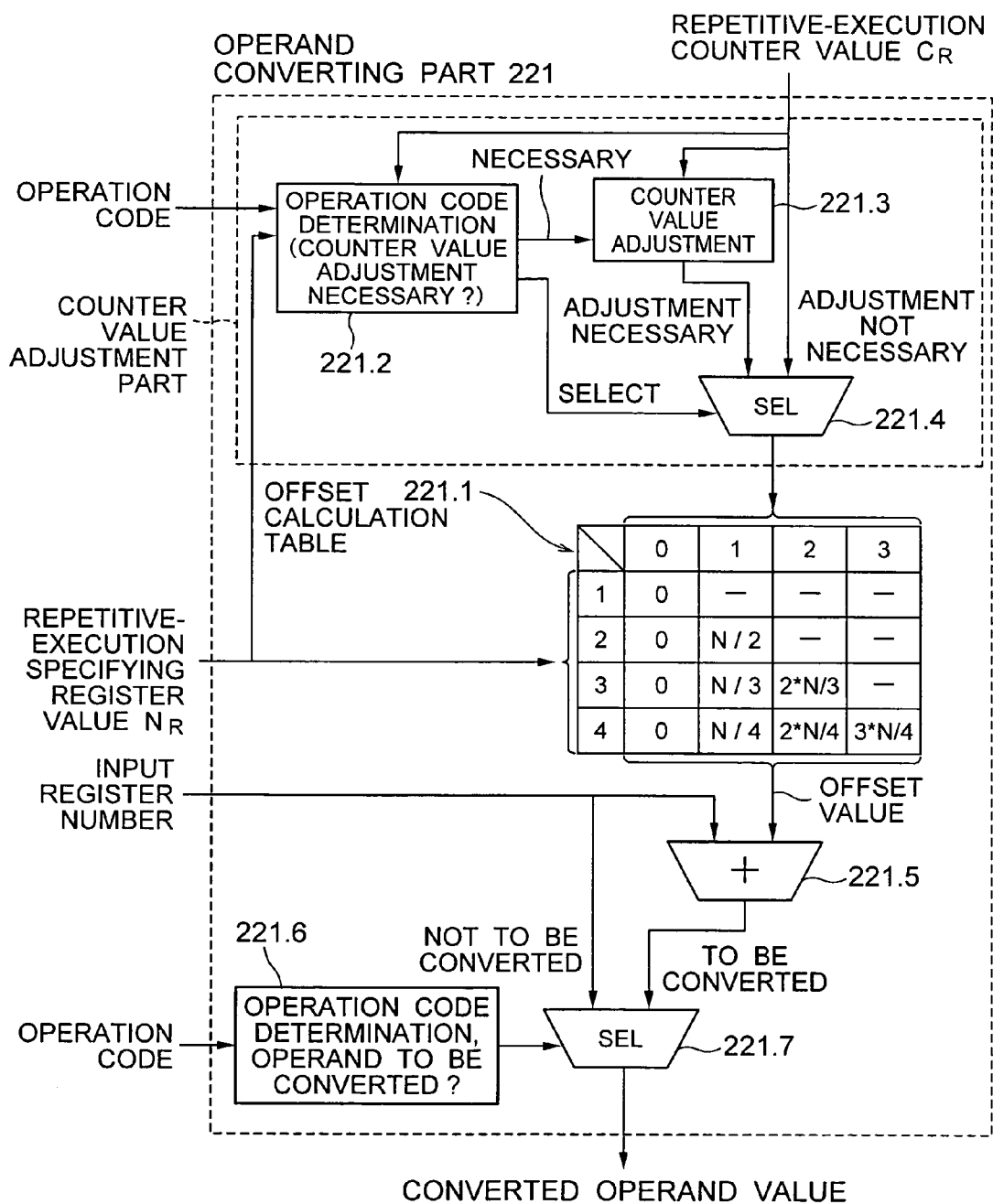
FIG. 2 is a block diagram functionally showing a configuration of an operand converting part in the parallel image processing system according to the exemplary embodiment.

FIG. 2 is a block diagram functionally showing the configuration of the operand converting part in the parallel image processing system according to the exemplary embodiment. The operand converting part 221 determines the offset value to be used in the conversion of the register number by using the offset calculation table with setting the repetitive-execution specifying register value NR and the repetitive-execution counter value CR as keys. Here, for responding to the number of repetitive executions specified by the value NR of the repetitive-execution specifying register 225, an offset calculation table 221.1 which is possible to respond to one time (not perform repetitive execution) to four times is prepared.

The offset calculation table 221.1 in FIG. 2 describes the number of registers as N. Whether or not the operation code is the command to be operand converted is determined (221.6), and from such result, whether to output the input register number as it is or output with the offset value determined by the offset calculation table 221.1 added thereto (221.5) is selected (221.7). That is, the result in which the input register number and the offset value determined by the offset calculation table 221.1 are added is output if the operation code is the command to be offset value operand converted, and the input register number is output as it is if the operation code is not the command to be operand converted.

The operand converting part 221 has a counter value adjusting portion for adjusting the repetitive-execution counter value CR when referencing the offset calculation table 221.1. The counter value adjusting portion is a unit necessary when performing repetitive execution of an adjacent pixel value acquisition command. When performing repetitive execution of the adjacent pixel value acquisition command, there are two cases as follows according to the value CR of the repetitive-execution counter 224: a case where the necessary adjacent pixel value is held by the adjacent PE and the pixel value is transferred from the adjacent PE to the own PE, and a case where the necessary adjacent pixel value is held by the own PE the and reference is made from the register in which the register number is offset. In this case, the register number specified in the input operand needs to be offset depending on whether the command is the command referencing the pixel value on the left or the right side, and whether the transfer destination is the adjacent PE or the own PE.

As shown in FIG. 2, the repetitive-execution counter value CR is replaced when referencing the offset calculation table 221.1. Whether or not adjustment of the count value CR is necessary is determined from the operation code (221.2.), where the count value CR is adjusted if necessary (221.3), the adjusted result is selected (221.4), and the offset calculation table 221.1 is referenced. If the adjustment of the count value CR is not necessary, the input count value CR is selected (221.4), and the offset calculation table 221.1 is referenced.

1.4) Memory Address Converting Part

The memory address converting part 222 is a unit for converting the address to be accessed when repetitively executing the memory access command. If the operation code input from the command fetching/decoding part 21 is the read/write command of the local memory 11, the address conversion of adding the value obtained by multiplying the value NH of the height-of-image-to-be-processed register 226 and the value CR of the repetitive-execution counter 224 to the input address is performed, and the converted address is provided to the command fetching/decoding part 21.

1.5) Operation Code Converting Part

The operation code converting part 223 is a unit for converting the operation code to be executed in the PE array 1 when executing the acquisition command of the left/right adjacent pixel values in which different operations need to be performed according to the pixel position to be executed in repetitive execution. If the operation code input from the command fetching/decoding part 21 is the acquisition command of the left/right adjacent pixel value, the pixel position in the plurality of pixels assigned to each PE of the pixel, which is the current execution target, is calculated by the values CR and NR of the repetitive-execution counter 224 and the repetitive-execution specifying register 225, determination is made on whether the adjacent pixel value to be acquired is held in the register of its PE or is held in the register of the adjacent PE, and the operation code converted so as to be read from its PE register or the register value is transferred from the right adjacent PE is forwarded to the command fetching/decoding part 21.

2. Operation

Figure 3:
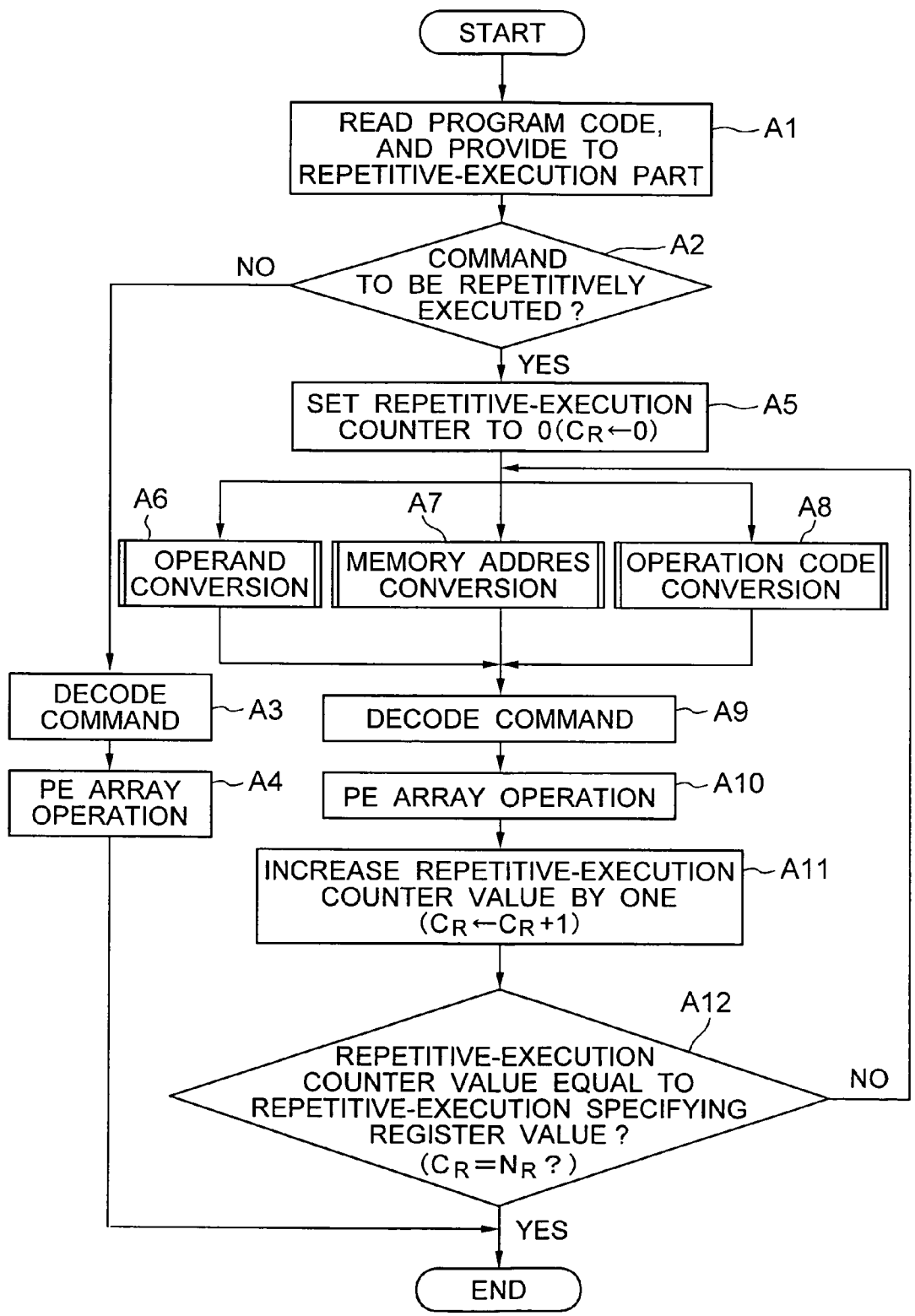
FIG. 3 is a flowchart showing an overall operation of the parallel image processing system according to the exemplary embodiment.

FIG. 3 is a flowchart showing an overall operation of the parallel image processing system according to the exemplary embodiment. The command fetching/decoding part 21 reads the program code of the address to be executed from the program stored in the program memory 3, and provides the same to the repetitive-execution part 22 (step A1). The repetitive-execution part 22 determines whether or not the operation code of the provided program code is the command to be repetitively executed (step A2). If determined as not the command to be repetitively executed (No in step A2), the program code is provided as is to the command fetching/decoding part 21, the PE array 1 is controlled, and the command process is performed (steps A3, A4).

If determined that the operation code is the command to be repetitively executed (YES in step A2), the value CR of the repetitive-execution counter 224 is initialized to zero (step A5), and the program code is provided to the operand converting part 221, the memory address converting part 222, and the operation code converting part 223 (steps A6, A7, A8).

The command fetching/decoding part 21 receives the program code converted by the operand converting part 221, the memory address converting part 222, and the operation code converting part 223 (step A9), interprets the same to control the PE array 1, and performs the process complying with each command (step A10).

Thereafter, the value CR of the repetitive-execution counter 224 is incremented by one (step A11), and compared with the value NR of the repetitive-execution specifying register 225 (step A12). If the value CR of the repetitive-execution counter 224 is smaller than the value NR of repetitive-execution specifying register 225 (NO in step A12), the process returns to steps A6, A7, and A8 and the repetitive-execution is performed. At the point the value CR of the repetitive-execution counter 224 becomes equal to the value NR of the repetitive-execution specifying register 225 (YES in step A12), the process proceeds to the next process of the program code with determining the necessary number of repetitive executions on one step of the input program code is ended.

The steps A6, A7, and A8 executed by the operand converting part 221, the memory address converting part 222, and the operation code converting part 223 will be hereinafter described in detail.

2.1) Operand Conversion

Figure 4:
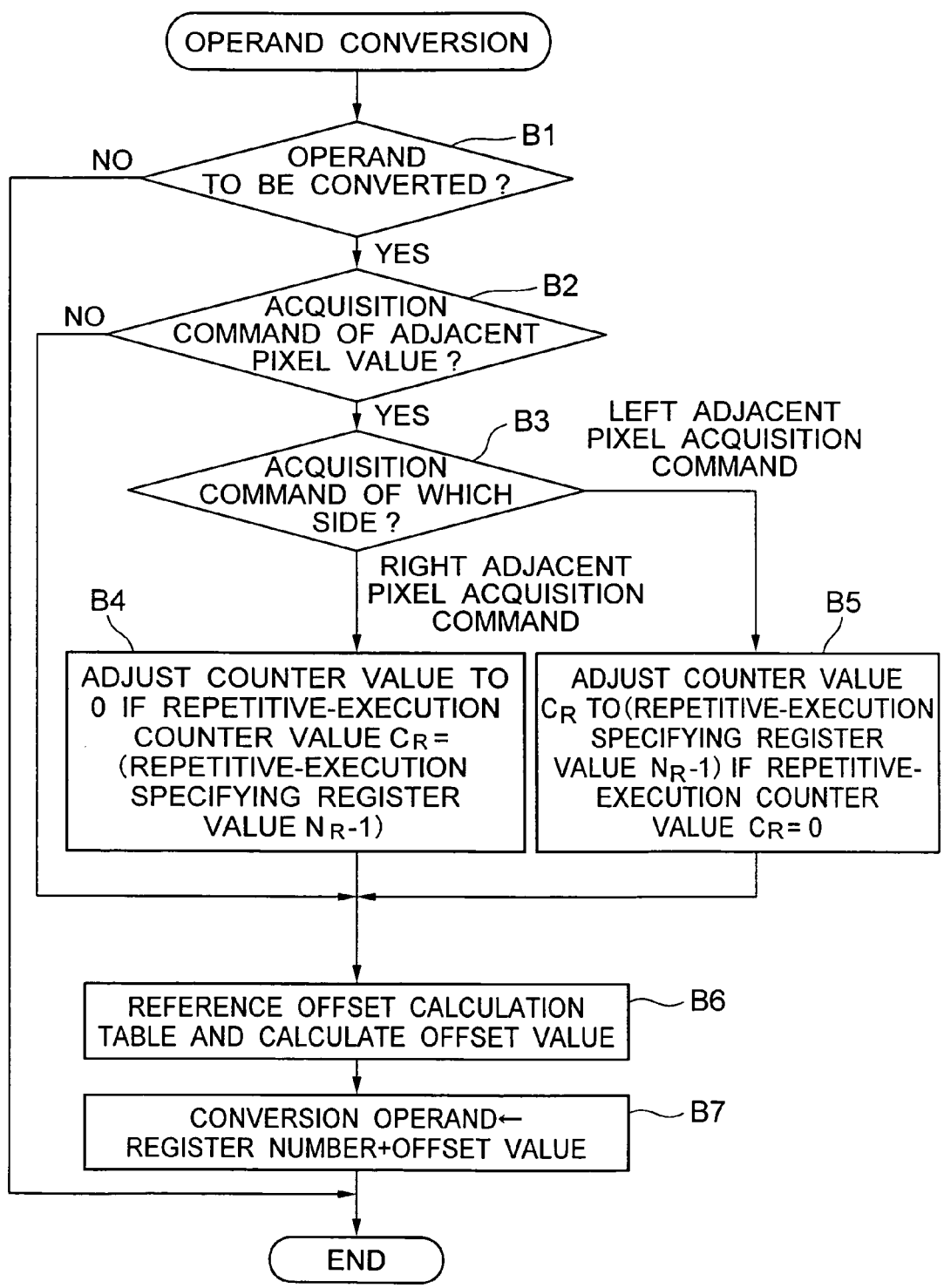
FIG. 4 is a flowchart showing an operand conversion operation of the parallel image processing system according to the exemplary embodiment.

FIG. 4 is a flowchart showing an operand conversion operation of the parallel image processing system according to the exemplary embodiment. The operand converting part 221 determines whether or not each operand to be the input source and the output destination contained in the program code input from the command fetching/decoding part 21 are to be converted by the operation code and the operand position (step B1). If the operand is not to be converted (NO in step B1), conversion is not performed, and the input register number is output as it is.

If the operand is to be converted (YES in step B1), whether or not the operation code is the acquisition command of the adjacent pixel value is determined (step B2). As described above, when repetitively executing the adjacent pixel value acquisition command, there are two cases as follows according to the value CR of the repetitive-execution counter 224: a case where the adjacent pixel value to be acquired is held by the adjacent PE and the pixel value is transferred from the adjacent PE to the own PE, and a case where the adjacent pixel value to be acquired is held by the own PE and reference is made from the register in which the register number is offset. In this case, since the register number specified in the input operand needs to be offset depending on whether the command is a command referencing the pixel value on either the left or the right side, and the transfer source is the adjacent PE or the own PE, a process of replacing the repetitive-execution counter value CR needs to be performed when referencing the offset calculation table. If the operation code is the acquisition command of the adjacent pixel value (YES in step B2), then it is determined that the operation code is a command for acquiring the left adjacent pixel value or a command for acquiring the right adjacent pixel value (step B3).

If the operation code is a command for acquiring the right adjacent pixel value, the register of the own PE is referenced, and the counter value adjustment is not performed if (repetitive-execution counter value CR) is smaller than (repetitive-execution specifying register value NR−1). If (repetitive-execution counter value CR) is equal to (repetitive-execution specifying register value NR−1), the register holding the pixel at the left end of the right adjacent PE is referenced, in which case, the input repetitive-execution counter value CR is adjusted (converted) to zero (step B4).

If the operation code is a command for acquiring the left adjacent pixel value, the register of the own PE is referenced, and the counter value adjustment is not performed if (repetitive-execution counter value CR) is larger than 0. If (repetitive-execution counter value CR) is equal to 0, the register of the left adjacent PE is referenced but the register value that becomes the right end of the pixels held by the left adjacent PE is referenced, and thus the input repetitive-execution counter value CR is adjusted (converted) to (repetitive-execution specifying register value NR−1) (step B5).

Thereafter, the offset calculation table 221.1 is referenced with the value NR of the repetitive-execution specifying register 225 and the value CR of the repetitive-execution counter 224 adjusted as necessary as keys, and the offset value of the operand is determined (step B6). The result in which the offset value is added to the input register number is output as an operand conversion result (step B7).

2.2) Memory Address Conversion

Figure 5:
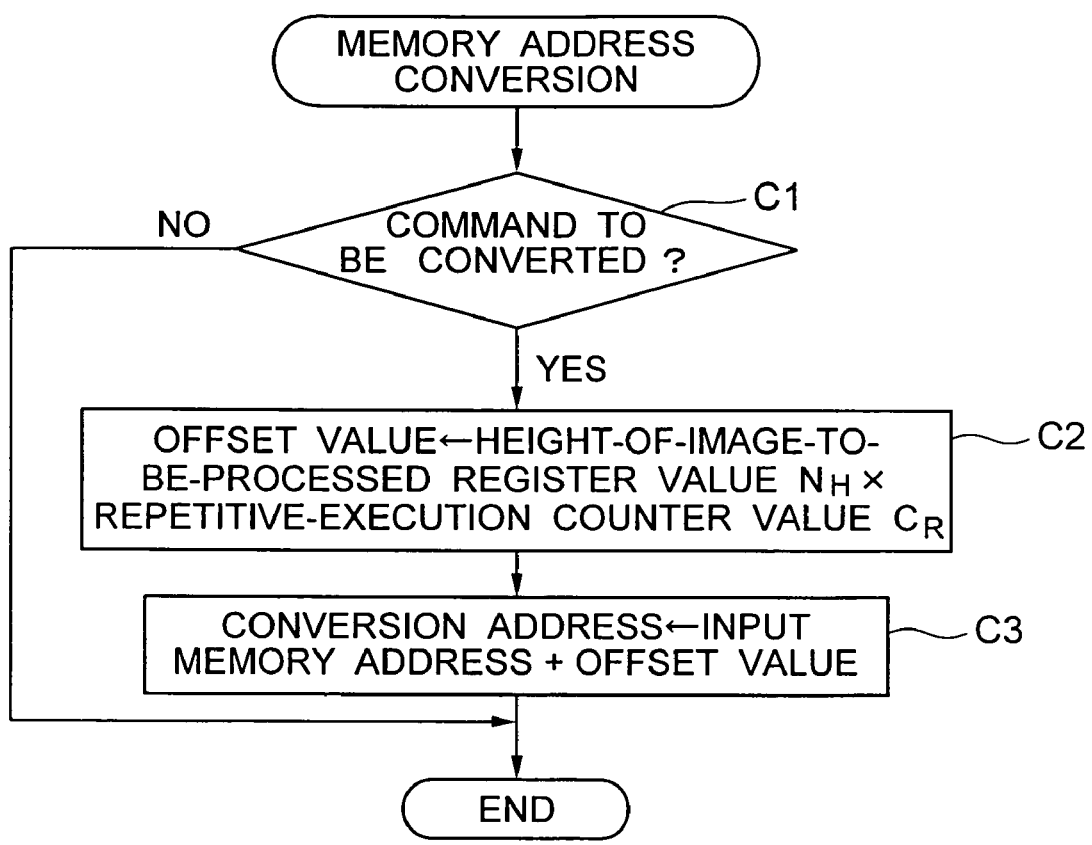
FIG. 5 is a flowchart showing a memory address conversion operation of the parallel image processing system according to the exemplary embodiment.

FIG. 5 is a flowchart showing a memory address conversion operation of the parallel image processing system according to the exemplary embodiment. The memory address converting part 222 determines whether the input operation code is the memory read command/memory write command etc. that becomes the target of memory address conversion (step C1).

If the input operation code is the command to be converted (YES in step C1), the value obtained by multiplying the value CR of the repetitive-execution counter 224 to the value NH of the height-to-be-processed register 226 is calculated as the offset value of the memory address (step C2). The value in which the calculated offset value is added to the input memory address is output as the converted memory address (step C3). If the input operation code is not the command to be converted (NO in step C1), conversion is not performed and the address is output as it is.

2.3) Operation Code Conversion

Figure 6:
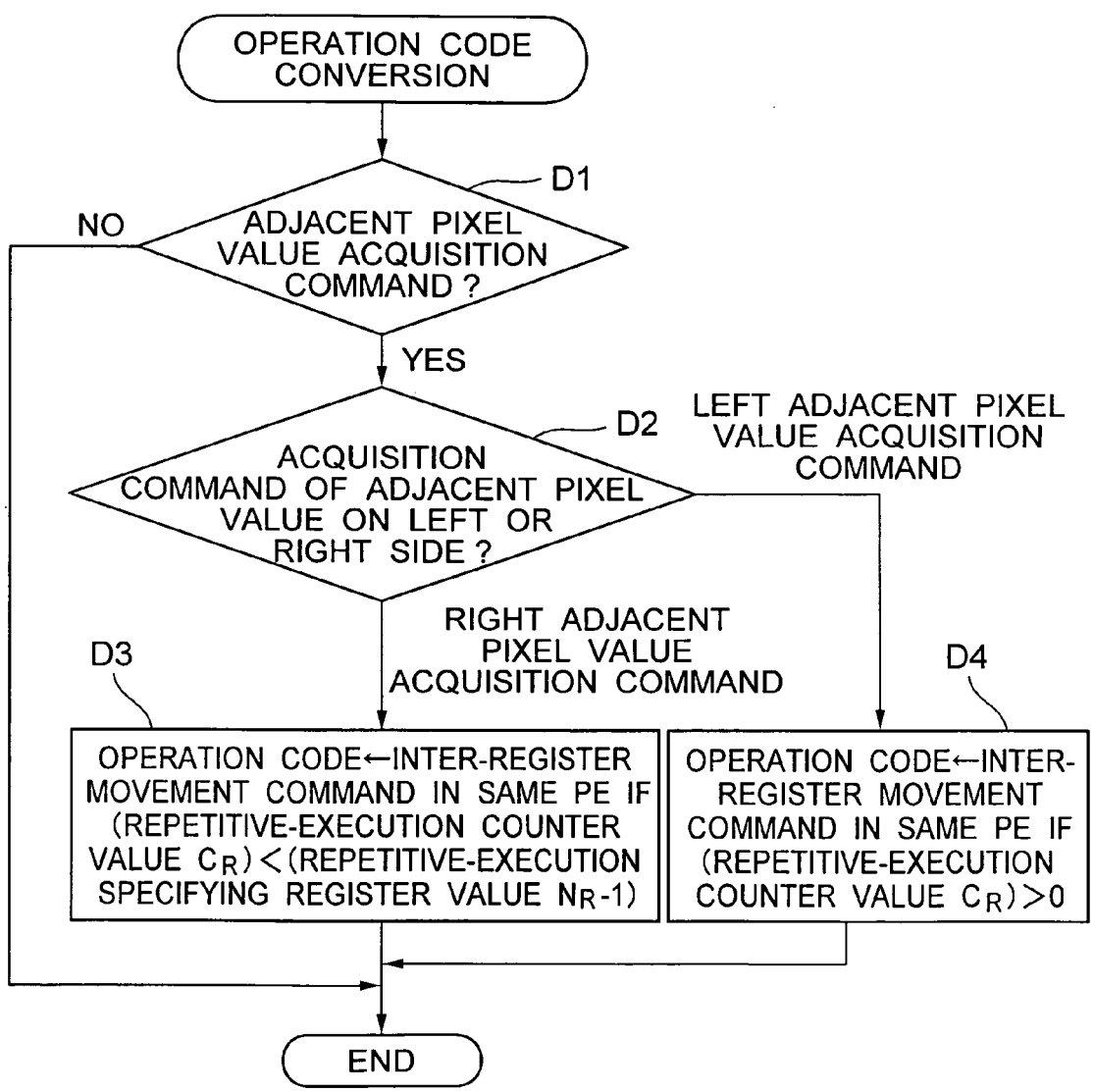
FIG. 6 is a flowchart showing an operation code conversion operation of the parallel image processing system according to the exemplary embodiment.

FIG. 6 is a flowchart showing an operation code conversion operation of the parallel image processing system according to the exemplary embodiment. The operation code converting part 223 determines whether or not the operation code input from the command fetching/decoding part 21 is the acquisition command of the left/right adjacent pixel values to be converted (step D1).

When the input operation code is the acquisition command of the left/right adjacent pixel value (YES in step D1), the following operation is performed depending on whether the operation code is the right adjacent pixel value acquisition command or the left adjacent pixel acquisition command (step D2).

If the operation code is the command for acquiring the right adjacent pixel value, the register of the own PE is referenced if repetitive-execution counter value CR is smaller than (repetitive-execution specifying register value NR−1), and thus the inter-register movement command in the same PE is output as the converted operation code. The register holding the pixel at the left end of the right adjacent PE is referenced if the repetitive-execution counter value CR is equal to (repetitive-execution specifying register value NR−1), and thus the command for transferring the register value of the right adjacent PE, which is the input operation code, is output as it is (step D3).

When the operation code is the command for acquiring the left adjacent pixel value, the register of the own PE is referenced if repetitive-execution counter value CR is larger than 0, and thus the inter-register movement command in the same PE is output as the converted operation code. If the repetitive-execution counter value CR is equal to 0, the register holding the left adjacent PE is referenced, and thus the command for transferring the register value of the left adjacent PE, which is the input operation code, is output as it is (step D4).

When the input operation code is not the acquisition command of the left/right adjacent pixel value (NO in step D1), the operation code conversion is not performed, and the operation code is output to the command fetching/decoding part 21 as it is.

3. Effect

As described above, according to the exemplary embodiment, the PE array control corresponding to the plurality of commands is performed by the repetitive-execution part 22 when the command fetching/decoding part 21 performs interpretation/execution on one command of the program code read from the program memory 3. Therefore, the process on the plurality of pixels assigned to each PE is described with one command, whereby the amount of program code can be reduced.

As the operation code converting part 223 is arranged in the repetitive-execution part 22, the operations that require different commands, that is, the transfer operation between adjacent PEs required when assigning a plurality of pixels in one PE and the operation using the pixel value held in the own PE can be collectively described in one command in the process requiring the exchange of adjacent left/right pixel value. Accordingly, the amount of program code can be further reduced, and the image processing on the SMID parallel image processing system having different number of PEs can be easily realized without changing the program.

EXAMPLES

The operation of the parallel image processing system according to one example of the present invention will now be described. As one example, the parallel image system where the PE array 1 in which one-hundred-twenty-eight PEs, which is half of the number of pixels in the width direction, are arrayed one-dimensionally is used on the image to be processed having width of 256 pixels×height of 256 pixels.

FIG. 7 is a view showing one example of a program for operating the parallel image processing system according to one example of the present invention. In this example, the process of obtaining an absolute value of a difference with the pixel value adjacent on the side for each pixel is shown. In the present example, each PE is assumed to include thirty-six registers. Since the number of PE is half of the number of pixels in the width direction of the image to be processed, the process of two pixels each is assigned to each PE. Thus, prior to the execution of the program, NR=2 is stored in the repetitive-execution specifying register 225, and the register group 13 is used by being divided into two groups of R(0) to R(17) and R(18) to R(35).

The image to be processed is stored in the local memory from the MEM1 address. In the present example, the process is performed with two pixels assigned to each PE, and thus such two pixels are stored in the address having an offset of 256, which is the number of pixels in the height direction. Of the images assigned to the PE, the pixel value on the left side is stored from address MEM1 address to address (MEM1+255), and the pixel value on the right side is stored from address (MEM1+256) address added with the offset value 256 to address (MEM1+511). Thus, 256, which is the number of pixels in the height direction of the image to be processed, are stored in the height-of-image-to-be-processed register 226. The processed result image is stored after the MEM2 address.

The operation of the parallel image processing system of the present invention will be described with reference to the program shown in FIG. 7 as one example, and also to the flowchart of FIG. 3.

First, the command fetching/decoding part 21 reads the first row of the program code (LD MEM1, R(0)) from the program memory 3, and provides the same to the repetitive-execution part 22 (step A1 of FIG. 3). The operation content of the first row of the program code is to read the value stored in the address MEM1 of the local memory 11, and store the same in the register R(0). Since the operation code portion of the program code is the memory read command (LD), the repetitive-execution part 22 determines it as the command to be repetitively executed and sets the repetitive-execution counter 224 to zero (step A5).

The program code is then provided to the operand converting part 221, the memory address converting part 222, and the operation code converting part 223. The operand converting part 221 references the values NR and CR of the repetitive-execution specifying register 225 and the repetitive-execution counter 224, and obtains zero as the offset value from the offset calculation table 221.1. By adding this offset value to the input register number 0, then the result "zero" is obtained, and the result zero is provided to the command fetching/decoding part 21 as the converted register number (step A6). The memory address converting part 222 references the value CR of the repetitive-execution counter 224, and provides the memory address MEM1 to the command fetching/decoding part 21 without performing the conversion since the value CR is zero (step A7). The operation code converting part 223 does not perform the operation code conversion since the input operation code is the memory read command (LD) and not the acquisition command of the left/right adjacent pixel value requiring the operation code conversion, and provides the input operation code as it is to the command fetching/decoding part 21 (step A8). The command fetching/decoding part 21 operates the PE array 1 based on the operation code, the memory address, and the operand input from the repetitive-execution part 22, and the content of the address MEM1 of the local memory 11 is stored in the register R(0) (steps A9, A10).

Subsequently, the repetitive-execution part 22 increases the value CR of the repetitive-execution counter 224 by one, and sets the value CR to one (step A11). Thereafter, the value CR=1 of the repetitive-execution counter 224 and the value NR=2 of the repetitive-execution specifying register 225 are compared, and determination is made that the executions is not repeated the necessary number of times since these values are not the same, and the process returns to the execution of the operand converting part 221, the memory address converting part 222, and the operation code converting part 223 (step A12).

The operand converting part 221 references the values NR and CR of the repetitive-execution specifying register 225 and the repetitive-execution counter 224, and obtains eighteen as the offset value from the offset calculation table 221.1. By adding the offset value to the input register number 0, then the result "eighteen" is obtained, and the result "eighteen" is provided to the command fetching/decoding part 21 as the converted register number (step A6). The memory address converting part 222 provides the address (MEM1+256) added with the offset 256 to the memory address MEM1 to the command fetching/decoding part 21 since the value CR of the repetitive-execution counter 224 is one (step A7). The operation code converting part 223 does not perform the operation code conversion since the input operation code is the memory read command (LD) and not the acquisition command of the left/right adjacent pixel value requiring the operation code conversion, and provides the input operation code as it is to the command fetching/decoding part 21 (step A8). The command fetching/decoding part 21 operates the PE array 1 based on the operation code, the memory address, and the operand input from the repetitive-execution part 22, and the content of the address (MEM1+256) address of the local memory 11 is stored in the register R(18) (steps A9, A10).

The repetitive-execution part 22 then increases the value CR of the repetitive-execution counter 224 by one, and sets the value CR to two (step A11). Thereafter, the value CR of the repetitive-execution counter 224 and the value NR specified by the repetitive-execution specifying register 225 are compared, and determination is made that the necessary repetitive execution is completed since the values CR and NR are equal and the process corresponding to the first row of the program code is ended, and the process proceeds to the next command process (step A12).

Next, the command fetching/decoding part 21 reads the second row of the program code (MVL R(0) R(1)) from the program memory 3, and provides the same to the repetitive-execution part 22 (step A1). The operation content of the second row of the program code is to store the value of the register R(0) corresponding to the right pixel in the register R(1). In a system in which one pixel is assigned to one PE, the operation is performed such as transferring the value stored in the register R(0) of the right adjacent PE to the own PE and storing the same in the register R(1), but since two pixels are assigned to one PE in the present example, the right pixel is not constantly held by the right adjacent PE, and the value of the right pixel with respect to the left pixel of the pixels to be processed assigned to the PE is stored in another register in the PE. Thus, the acquiring operation of the right pixel value is divided into two types, i.e., an operation of reading the register value in the own PE according to the pixel to be processed, or, an operation of transferring the register R(0) of the right adjacent PE to the own PE. Since the operation code is the transfer command of the right adjacent pixel value, the repetitive-execution part 22 determines it as the command to be repetitively executed and sets the value of the repetitive-execution counter 224 to zero, and thereafter operates the operand converting part 221 and the operation code converting part 223 (steps A2, A5).

The operand converting part 221 performs the operand converting process on the input source register and the output destination register designated in the program code (step A6). Since the input operation code is the acquisition command (MVL) of the right adjacent pixel value, different operand operations are performed in the input source register and the output destination register. With respect to the input source register, the values NR and CR of the repetitive-execution specifying register 225 and the repetitive-execution counter 224 are referenced, and eighteen is obtained as the offset value using the offset calculation table 221.1. By adding the offset value to the input register number 0, then the result "eighteen" is obtained, and the result "eighteen" is provided to the command fetching/decoding part 21 as the converted input source register number. With respect to the output destination register, by adjusting the repetitive-execution counter value CR when referencing the offset calculation table to zero and performing offset calculation, the offset value "zero" is obtained, and the offset value "zero" is added to the input register number 1, thus the result "one" is obtained, then the result "one" is provided to the command fetching/decoding part 21 as the converted output destination register number.

The operation code converting part 223 determines that the right adjacent pixel value acquisition command (MVL) is the command requiring the operation code conversion, converts the command (MVL) to the inter-register movement command in the same PE since the value CR of the repetitive-execution counter 224 is not equal to the (value NR−1 of the repetitive-execution specifying register 225), and provides the same to the command fetching/decoding part 21 (step A8). The command fetching/decoding part 21 operates the PE array 1, and the content of the register R(18) is stored in the register R(1) (steps A9, A10).

The repetitive-execution part 22 increases the value CR of the repetitive-execution counter 224 by one, and sets the value CR to one (step A11). Thereafter, the value CR=1 of the repetitive-execution counter 224 and the value NR=2 of the repetitive-execution specifying register 225 are compared, and determination is made that the necessary repetitive execution is not completed since such values are not the same, and the process returns to the execution of the operand converting part 221 and the operation code converting part 223 (step A12).

The operand converting part 221 performs the conversion so as to transfer the content of the register R(0) of the right PE since the operation code is the transfer command (MVL) of the right adjacent pixel value and the value CR of the repetitive-execution counter 224 is equal to (value NR−1 of the repetitive-execution specifying register 225). Thus, with respect to the input source register, by adjusting the repetitive-execution counter value CR when referencing the offset calculation table 221.1 to zero and performing offset calculation, the offset value "zero" is obtained, and the offset value "zero" is added to the input source register number 0 which is input, thus the result "zero" is obtained, then the result "zero" is provided to the command fetching/decoding part 21 as the converted input source register number. With respect to the output destination register, conversion similar to the first row is performed, by using the offset calculation table 221.1 from the values NR and CR of the repetitive-execution specifying register 225 and the repetitive-execution counter 224, the offset value "eighteen" is obtained, and the offset value "eighteen" is added to the output destination register number 1 which is input, thus the result "nineteen" is obtained, then the result "nineteen" is provided to the command fetching/decoding part 21 as the converted output destination register number (step A6).

Although the input operation code is the command to which an operation code conversion is to be performed, since the value CR of the repetitive-execution counter 224 is equal to the (value NR−1 of the repetitive-execution specifying register 225), the operation code converting part 223 does not perform conversion, and provides the command to the command fetching/decoding part 21 (step A8). The command fetching/decoding part 21 operates the PE array 1 and the content of the register R(0) of the right PE is stored in the register R(19) (steps A9, A10).

The repetitive-execution part 22 increases the value CR of the repetitive-execution counter 224 by one and sets the value to "two" (step A11). This value is the same as the value NR specifying in the repetitive-execution specifying register 225, and thus determination is made that the necessary repetitive execution is terminated, the process corresponding to the second row of the program code is ended, and the process proceeds to the next command process (step A12).

The command fetching/decoding part 21 reads the third row of the program code (ABS R(0), R(1), R(2)) from the program memory 3, and provides the program code to the repetitive-execution part 22. The operation content of the third row of the program code is to calculate the absolute value of the difference between the register R(0) and the register R(1), and store the calculation result in the register R(2). The repetitive-execution part 22 performs the conversion, similar to the case of the first row, on the operands of designating the input source and designating the output destination to perform the repetitive operation, and as a consequence of the fact that the command fetching/decoding part 21 operates the PE array 1, the absolute value of the difference between the register R(0) and the register R(1) is stored in the register R(2), and the absolute value of the difference between the register R(18) and the register R(19) is stored in the register R(20), and the process proceeds to the next command process.

The command fetching/decoding part 21 reads the fourth row of the program code (ST MEM2, R(2)), and provides the program code to the repetitive-execution part 22. The operation content of the fourth row of the program code is to read the value stored in the register R(2), and writing the value to the address MEM2 of the local memory 11. The conversion of the memory address and the operand similar to the case of the first row is performed in the repetitive-execution part 22, the command fetching/decoding part 21 operates the PE array 1, and the value of the register R(2) is stored in the address MEM2 address of the local memory 11, and the value of the register R(20) is stored in the address (MEM2+256) of the local memory 11.

Therefore, in the present example, the amount of program code can be reduced since the PE array control corresponding to two commands is performed by the repetitive-execution part 22 with respect to the one command of the program code read from the program memory 3. Furthermore, since a different command can be executed in a partial cycle during the repetitive execution by the operation code converting part 223, the operation by automated repetitive execution also becomes possible in the exchanging process with the adjacent pixel that cannot be handled with the repetitive execution of the same command, and the amount of program code can be further reduced.

An example where the ratio of the number of pixels in the width direction of the image to be processed and the number of PEs is 2:1 is described in the present example, but the ratio is not limited thereto, and it is also applicable to cases where the number of pixels in the width direction of the image to be processed is greater than the number of PEs in the system such as 3:1, 4:1, ..., N:1.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

According to the present invention, application can be made to image processing device, image examining device, and image recognition device having video image, sensor image and the like as inputs.

The invention claimed is:

1. A control method of a parallel image processing system having a smaller number of element processors than number of images to be processed, each element processor being controlled by a command fetching/decoding part to process plural images to be processed, the parallel image processing system including: a repetitive-execution specifying register for specifying a number of repetitions NR when performing repetitive execution of a command assigned to each element processor according to a ratio of the number of element processors to a number of pixels in a width direction of an image to be processed; a height-of-image-to-be-processed register for holding a number of pixels NH in a height direction of the image to be processed, where the number of pixels NH is used to calculate an offset value of an address storing the image to be processed in the repetitive execution of a memory access command assigned to one of the element processors; and a repetitive-execution counter CR used when the command is repetitively executed by the number of times specified by the repetitive-execution specifying register; the method comprising:

determining whether or not the command requires operand conversion by an operation code input from the command fetching/decoding part; if the operand conversion is necessary, dividing a number of registers in a register group of the element processors by the number of repetitive-executions NR stored in the repetitive-execution specifying register; multiplying each divided number of registers by a value from 0 to (NR−1) stored in the repetitive-execution counter to obtain an offset value used in switching a register position; and outputting the offset value to the command fetching/decoding part;

performing, if the operation code input from the command fetching/decoding part is a read/write command of a local memory of one of the element processors, address conversion of adding a value obtained by multiplying the NH of the height-of-image-to-be-processed register and the CR of the repetitive counter to an input address; and outputting the converted address to the command fetching/decoding part; and calculating, if the operation code input from the command fetching/decoding part is an acquisition command of an adjacent pixel value, a pixel position in a plurality of pixels assigned to each element processors of a pixel, which is a current execution target, by the CR and NR of the repetitive-execution counter and the repetitive-execution specifying register; determining whether the adjacent pixel value to be acquired is held in the register of its element processor or is held in the register of an adjacent element processor; and outputting an operation code converted so as to be read from the register of its element processor or the register value is transferred from the adjacent element processor, to the command fetching/decoding part.

2. The control method of the parallel image processing system according to claim 1, wherein when processing a plurality of pixels as the processing data, the command is automatically repetitive executed according to a number of pixels assigned to the element processor;

when repetitively executing an adjacent pixel value acquisition command, an operation code is replaced with a combination of a command for transferring a pixel value from an adjacent element processor and a command for acquiring a pixel value on an own element processor according to a position of the pixel to be processed; and the element processor is controlled by the replaced operation code.

3. The control method of the parallel image processing system according to claim 2, wherein a register group is divided in accordance with the number of pixels assigned to each element processor for use, and the operand is rewritten to switch the register group to be used in the repetitive execution; and an offset value corresponding to the number of pixels assigned to the element processor is added to an address in repetitive execution of a memory access command.

4. A control apparatus of a parallel image processing system having a smaller number of element processors than number of images to be processed, each element processor processing plural images to be processed; the apparatus comprising:

a command fetching/decoding part for controlling the element processors by assigning a command to each element processor;

a repetitive-execution specifying register for specifying a number of repetitions NR when performing repetitive execution of a command assigned to each element processor according to a ratio of the number of element processors to a number of pixels in a width direction of an image to be processed;

a height-of-image-to-be-processed register for holding a number of pixels NH in a height direction of the image to be processed, where the number of pixels NH is used to calculate an offset value of an address storing the image to be processed in the repetitive execution of a memory access command assigned to one of the element processors;

a repetitive-execution counter CR used when the command is repetitively executed by the number of times specified by the repetitive-execution specifying register;

an operand converting part for determining whether or not the command requires operand conversion by an operation code input from the command fetching/decoding part; if the operand conversion is necessary, dividing a number of registers in a register group of the element processors by the number of repetitive-executions NR stored in the repetitive-execution specifying register; multiplying each divided number of registers by a value from 0 to (NR−1) stored in the repetitive-execution counter to obtain an offset value used in switching a register position; and outputting the offset value to the command fetching/decoding part;

a memory address converting part for performing, if the operation code input from the command fetching/decoding part is a read/write command of a local memory of one of the element processors, address conversion of adding a value obtained by multiplying the NH of the height-of-image-to-be-processed register and the CR of the repetitive counter to an input address; and outputting the converted address to the command fetching/decoding part; and an operation code converting part for calculating, if the operation code input from the command fetching/decoding part is an acquisition command of an adjacent pixel value, a pixel position in a plurality of pixels assigned to each element processors of a pixel, which is a current execution target, by the CR and NR of the repetitive-execution counter and the repetitive-execution specifying register; determining whether the adjacent pixel value to be acquired is held in the register of its element processor or is held in the register of an adjacent element processor; and outputting an operation code converted so as to be read from the register of its element processor or the register value is transferred from the adjacent element processor, to the command fetching/decoding part.

5. The control apparatus of the parallel image processing system according to claim 4, wherein when processing a plurality of pixels as the processing data,
the repetitive-execution device automatically performs repetitive execution of a command according to a number of pixels assigned to the element processor; and the repetitive-execution device includes an operation code converting device for replacing an operation code with a combination of a command for transferring a pixel value from an adjacent element processor and a command for acquiring a pixel value on an own element processor according to a position of the pixel to be processed when repetitively executing an adjacent pixel value acquisition command, and controls the element processor by the replaced operation code.

6. The control apparatus of the parallel image processing system according to claim 5, wherein
the element processor includes a one-dimensional processor array structure for processing a plurality of pixels; and the one-dimensional processor array structure is a one-dimensional SIMD (Single Instruction Multiple Data) processor array structure.

7. The control apparatus of the parallel image processing system according to claim 6, wherein the repetitive-execution means further includes,
an operand converting device for dividing a register group in accordance with the number of pixels assigned to each element processor for use, and rewriting the operand to switch the register group to be used in the repetitive execution; and a memory address converting device for adding an offset value corresponding to the number of pixels assigned to the element processor to an address in repetitive execution of a memory access command.

* * * * *